United States Patent
Zhou

(10) Patent No.: US 9,995,842 B2
(45) Date of Patent: Jun. 12, 2018

(54) BOREHOLE FLUID AND/OR CASING EFFECT CORRECTION FOR PULSED NEUTRON MEASUREMENTS

(71) Applicant: Schlumberger Technology Corporation, Sugar Land, TX (US)

(72) Inventor: Tong Zhou, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days. days.

(21) Appl. No.: 14/726,111

(22) Filed: May 29, 2015

(65) Prior Publication Data

US 2016/0349399 A1  Dec. 1, 2016

(51) Int. Cl.
*G01V 5/10* (2006.01)

(52) U.S. Cl.
CPC .............. *G01V 5/102* (2013.01); *G01V 5/101* (2013.01)

(58) Field of Classification Search
CPC ........ G01V 5/102; G01V 5/101; G01V 5/104; G01V 5/108; G01V 5/105; G01V 5/04; G01V 5/10; E21B 47/1015
See application file for complete search history.

(56) References Cited

U.S. PATENT DOCUMENTS

| 4,464,569 A | 8/1984 | Flaum |
| 4,645,926 A | 2/1987 | Randall |
| 5,293,410 A | 3/1994 | Chen et al. |
| 5,498,960 A | 3/1996 | Vinegar et al. |
| 5,539,225 A | 7/1996 | Loomis et al. |
| 5,608,215 A | 3/1997 | Evans |
| 5,699,246 A | 12/1997 | Plasek et al. |
| 5,804,820 A | 9/1998 | Evans et al. |

(Continued)

FOREIGN PATENT DOCUMENTS

| EP | 2426516 A2 | 3/2012 |
| WO | WO2010135618 A2 | 11/2010 |

(Continued)

OTHER PUBLICATIONS

International Seach Report and Written Opinion Issued in the related PCT Application PCT/US2013/034343, dated Jul. 11, 2013 (8 pages).

(Continued)

*Primary Examiner* — Marcus Taningco
(74) *Attorney, Agent, or Firm* — Michael Dae

(57) ABSTRACT

A method for determining hydrogen index includes using measurements of gamma rays detected during operation of a pulsed neutron source and numbers of thermal neutron capture gamma rays made at at least two different axial spacings from a pulsed neutron source. Either a first ratio of or a first logarithm of the first ratio of the burst gamma rays is determined for a first and second axial distance from the neutron source. A second logarithm is determined of a second ratio of the thermal neutron capture gamma rays detected at a first axial spacing with respect to the numbers detected at a second axial spacing. A corrected second ratio of the numbers of thermal neutron capture gamma rays is determined using either (i) the first logarithm and (ii) the first ratio, and the second logarithm. The corrected second ratio is used to determine the hydrogen index.

18 Claims, 13 Drawing Sheets

(56) References Cited

U.S. PATENT DOCUMENTS

| | | | |
|---|---|---|---|
| 5,909,772 | A | 6/1999 | Merkel et al. |
| 6,703,606 | B2 | 3/2004 | Adolph |
| 6,754,586 | B1 | 6/2004 | Adolph et al. |
| 6,884,994 | B2 | 4/2005 | Simonetti et al. |
| 7,667,192 | B2 | 2/2010 | Fricke et al. |
| 8,471,197 | B2 | 6/2013 | Inanc et al. |
| 9,268,056 | B2 | 2/2016 | Zhou et al. |
| 9,310,515 | B2 | 4/2016 | Zhou et al. |
| 2002/0170348 | A1 | 11/2002 | Roscoe et al. |
| 2004/0128073 | A1 | 7/2004 | Radtke et al. |
| 2006/0226351 | A1 | 10/2006 | Stoller et al. |
| 2006/0284066 | A1 | 12/2006 | Jacobson |
| 2007/0023626 | A1 | 2/2007 | Riley et al. |
| 2009/0210161 | A1* | 8/2009 | Duenckel ............ G01V 5/101 702/8 |
| 2011/0001040 | A1* | 1/2011 | Smith, Jr. ............ G01V 5/101 250/264 |
| 2011/0213555 | A1 | 9/2011 | Kopal et al. |
| 2011/0284731 | A1 | 11/2011 | Roscoe et al. |
| 2011/0313669 | A1 | 12/2011 | Thornton |
| 2012/0016588 | A1* | 1/2012 | Evans ............... G01V 5/104 702/8 |
| 2012/0126106 | A1 | 5/2012 | Zhou et al. |
| 2012/0148004 | A1 | 6/2012 | Caruso et al. |
| 2012/0197529 | A1* | 8/2012 | Stephenson ......... G01V 5/101 702/8 |
| 2012/0215451 | A1 | 8/2012 | Husser et al. |
| 2013/0105678 | A1 | 5/2013 | Wilson et al. |
| 2013/0166223 | A1 | 6/2013 | Triplett |
| 2013/0282288 | A1 | 10/2013 | Quinn et al. |
| 2014/0042311 | A1 | 2/2014 | Zhou et al. |
| 2014/0088877 | A1 | 3/2014 | Ellis et al. |
| 2014/0129149 | A1 | 5/2014 | Gzara et al. |
| 2014/0343856 | A1* | 11/2014 | Zhou ............... G01V 5/104 702/8 |
| 2015/0226874 | A1 | 8/2015 | Inanc et al. |
| 2015/0247948 | A1 | 9/2015 | Zhou et al. |
| 2015/0268376 | A1 | 9/2015 | Zhou et al. |
| 2015/0331141 | A1 | 11/2015 | Grau et al. |
| 2016/0003025 | A1 | 1/2016 | Beekman et al. |
| 2016/0003969 | A1 | 1/2016 | Zhou et al. |
| 2016/0349398 | A1 | 12/2016 | Zhou et al. |
| 2016/0349399 | A1 | 12/2016 | Zhou |
| 2017/0160425 | A1 | 6/2017 | Miles et al. |
| 2017/0227671 | A1 | 8/2017 | Zhou |

FOREIGN PATENT DOCUMENTS

| | | |
|---|---|---|
| WO | WO2012012101 A2 | 1/2012 |
| WO | WO2012012120 A2 | 1/2012 |
| WO | WO2012083210 A2 | 6/2012 |

OTHER PUBLICATIONS

International Preliminary Report on patentability Issued in the related PCT Application PCT/US2013/034343, dated Oct. 1, 2014 (6 pages).

European Search Report issued in the related EP Application 13769611.8, dated Mar. 3, 2016 (5 pages).

Communication pursuant to Article 94(3) issued in the related EP Application 13769611.8, dated Mar. 23, 2016 (6 pages).

Robert Freedman, et al., A modern method for using databases to obtain accurate solutions to complex reservoir characterization problems, SPE Reservoir Evaluation & Engineering, Dec. 31, 2011, SPE 147169, pp. 1-15.

International Seach Report and Written Opinion Issued in the related PCT Application PCT/US2014/037672, dated Sep. 2, 2014 (14 pages).

International Preliminary Report on patentability Issued in the related PCT Application PCT/US2014/037672, dated Nov. 17, 2015 (10 pages).

\* cited by examiner

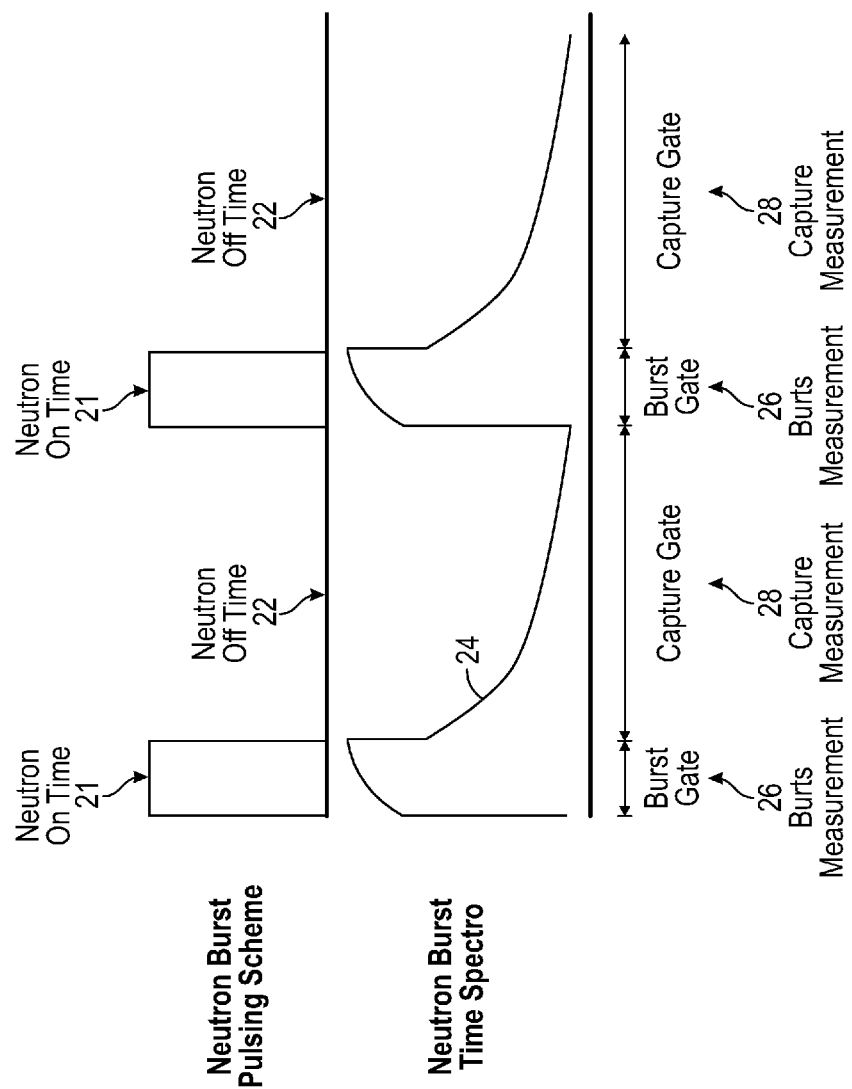

BOREHOLE FLUID AND/OR CASING EFFECT CORRECTION FOR PULSED NEUTRON MEASUREMENTS

CROSS-REFERENCE TO RELATED APPLICATIONS

Not applicable.

STATEMENT REGARDING FEDERALLY SPONSORED RESEARCH OR DEVELOPMENT

Not applicable.

NAMES TO THE PARTIES TO A JOINT RESEARCH AGREEMENT

Not applicable.

BACKGROUND

This disclosure relates generally to the field of pulsed neutron well logging. More specifically, the disclosure is related to methods for determining formation hydrogen index or neutron porosity when a wellbore contains various fluids, such as oil gas and/or air in unknown quantities.

Subsurface formation HI (hydrogen index) measurement using high energy neutrons as a measurement source has been used in well logging since at least the 1950s. In case of no bound-water in the formation matrix (such as clean sand, carbonate formation, but not shale), hydrogen atoms only appear in the pore space (oil or water). Thus, the formation hydrogen index is typically related to formation porosity. Neutron source based porosity measurements known in the art rely on the fact that the slowing down of neutrons, and therefore the average distance travelled within the formations by the neutrons, is strongly dependent on the hydrogen content of the formation. The hydrogen content dependency is due to the fact that neutrons can incur a very large energy loss in a single elastic scattering event with a proton (a hydrogen nucleus). In its simplest form, neutron based porosity measurement can be performed using a neutron source and a detector axially spaced from the neutron source. If the axial spacing of the detector from the source is chosen appropriately, then the neutron flux at the detector location will decrease monotonically with increasing formation hydrogen content. As one possible alternative, the neutron detector can be replaced by a gamma-ray detector, since the flux of neutron induced gamma-rays is related to the neutron flux.

Early versions of neutron-based porosity measurement instruments included those having a single gamma-ray detector (e.g., a Geiger-Mueller counter) with a radioisotope-based neutron source (e.g., $^{241}$AmBe, $^{238}$PuBe). Such instruments may be referred to as "neutron-gamma" instruments. Correspondingly, instruments using a neutron detector (e.g., a $^{3}$He proportional counter) may be referred to as "neutron-neutron" instruments. Traditionally, the term "neutron porosity" typically means a neutron-based porosity measurement using a $^{241}$AmBe source and "neutron-neutron" instruments. The following terms are defined in order to differentiate this work from the traditional "neutron porosity". "Neutron-neutron porosity" may be defined as neutron porosity based on a neutron source and neutron detectors. Similarly, "neutron-gamma porosity" may be defined as neutron porosity based on a neutron source and gamma ray detectors, which is the subject of the present disclosure Both neutron-neutron instrument measurements and to an even larger extent neutron-gamma instrument measurements are strongly affected by a multitude of environmental effects. Such effects include the fluid actually disposed in the wellbore at the time measurements are made.

It can be more difficult to measure formation HI based on gamma ray detectors as compared to using neutron detectors. In addition to other phenomena, gamma ray detectors measure the gamma rays from neutron "capture" interaction (i.e., capture of a thermal neutron by a nucleus of certain atoms having large "neutron capture cross section" and subsequent emission of a gamma ray) in the formation, wellbore or the instrument itself. Capture gamma ray measurement is therefore an indirect measurement the presence of neutrons. The physics of neutron-neutron porosity only involves neutron transport from the source to the neutron detector. The physics of neutron gamma porosity involves both neutron and gamma ray transport, so that such physics are more complex. Thus, neutron-gamma porosity may have more environmental effects which may be more difficult to interpret.

Notwithstanding the additional complexity in interpretation there may be advantages associated with measuring neutron-gamma porosity. The count rate of a gamma ray detector can be more than 1 order of magnitude higher than a $^{3}$He neutron detector. The depth of investigation (lateral distance from the wellbore wall into the formation) of a neutron-gamma measurement may be deeper than that of a neutron-neutron measurement. The energy of a gamma ray from a neutron capture event is normally in the million electron volt (MeV) range, which means such gamma rays can travel a longer distance than a thermal neutron before absorption. A scintillation type gamma ray detector can also provide gamma ray spectroscopy and inelastic neutron scatter-related measurements, which a thermal or epithermal neutron detector cannot. The foregoing features make neutron-gamma porosity very appealing.

SUMMARY

A method for determining a formation hydrogen index according to one aspect of the disclosure includes using measurements of numbers of gamma rays detected during operation of a pulsed neutron source ("burst gamma rays") to irradiate a formation and numbers of thermal neutron capture gamma rays made at at least two different axial spacings from the pulsed neutron source. At least one of (i) a first ratio of and (ii) a first logarithm of the first ratio of the numbers of burst gamma rays detected at a first axial spacing with respect to a number of burst gamma rays detected at a second axial spacing is determined. A second logarithm of a second ratio of the numbers of thermal neutron capture gamma rays detected at a first axial spacing with respect to the numbers of thermal neutron capture gamma rays detected at a second axial spacing is determined. A corrected second ratio of the numbers of thermal neutron capture gamma rays is determined using at least one of (i) the first logarithm and (ii) the first ratio, and the second logarithm. The formation hydrogen index is determined from the corrected second ratio.

This summary is provided to introduce a selection of concepts that are further described below in the detailed description. This summary is not intended to identify key or essential features of the claimed subject matter, nor is it

BRIEF DESCRIPTION OF THE DRAWINGS

FIG. 2 shows an example of source and detector timing used in some examples.

DETAILED DESCRIPTION

Figure 1:
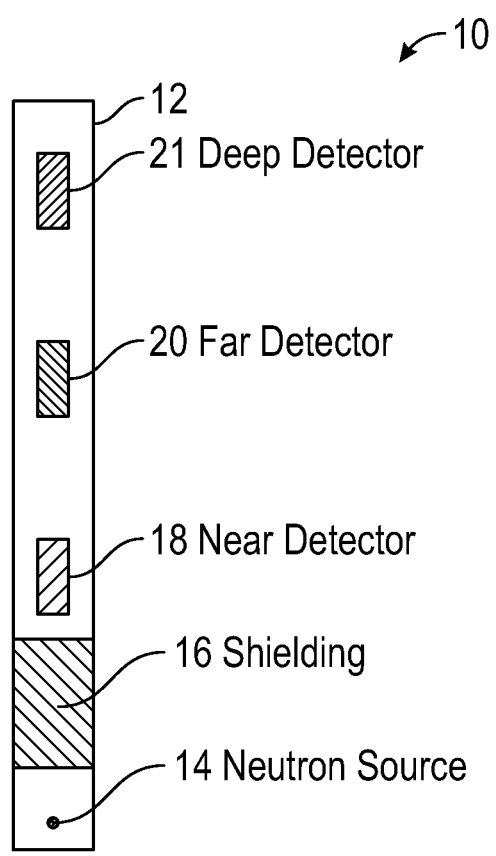
FIG. 1 shows an example neutron-gamma well logging instrument using a "pulsed" neutron source.

FIG. 1 shows an example "neutron-gamma porosity" well logging instrument 10. The measurement components of the instrument 10 may be disposed in a housing 12 shaped and sealed to be moved along the interior of a wellbore. The pulsed neutron well logging instrument 10 may, in a form hereof, be of a type described, for example, in U.S. Pat. No. 5,699,246.

The instrument housing 12 contains a pulsed neutron source 14, and two or more gamma ray detectors 18, 20, 21 at different axial spacings from the pulsed neutron source. The pulsed neutron source 14 (hereinafter "source"), when activated, will emit controlled duration "bursts" of high energy neutrons (approximately 14 MeV, and which may be emitted isotropically). One example of a pulsed neutron source is described in U.S. Pat. No. 5,293,410 issued to Chen et al.

Shielding 16 may be interposed between the source 14 and the axially closest detector (e.g., near detector 16) to reduce the effects of direct neutron communication between the source 14 and the detectors 18, 20, 21. The detectors 18, 20, 21 may be scintillation counters each coupled to a respective counter or pulse height analyzer (not shown separately). Thus, numbers of and, with the use of a pulse height analyzer, energy of detected gamma rays may be characterized at each of a plurality of distances from the source 14.

The gamma ray detectors 18, 20, 21 may detect gamma rays arriving at the detector as a function of time. There are two principal mechanisms, through which a neutron-induced gamma ray can be generated. One is neutron inelastic scattering, which can be triggered only by "fast" neutrons (with energy above approximately 1 MeV, the exact energy threshold depending on the type of nucleus). The other is through neutron capture, which can be triggered primarily by thermal neutrons (with energy around 0.025 eV at room temperature) or epithermal neutrons (with energy from about 0.4 to 100 eV) being absorbed into a susceptible nucleus, as non-limiting examples, chlorine, boron and cadmium. When the source 14 is activated, the gamma rays arriving at the detectors 18, 20, 21 may be generated through both mechanisms because the source keeps emitting fast neutrons which can slow down to epithermal or thermal almost instantly (relative to the acquisition system timing). When the source 14 is switched off, the gamma rays arriving at the detectors 18, 20, 21 may be generated by epithermal or thermal neutron capture because no new fast neutrons are emitted into the wellbore and formations. Thus, the measured gamma ray flux at the detectors 18, 20, 21 during the source off time is an indirect measurement of epithermal and thermal neutrons. Such indirect measurement can be used to provide formation hydrogen index (HI) measurement.

Figure 1A:
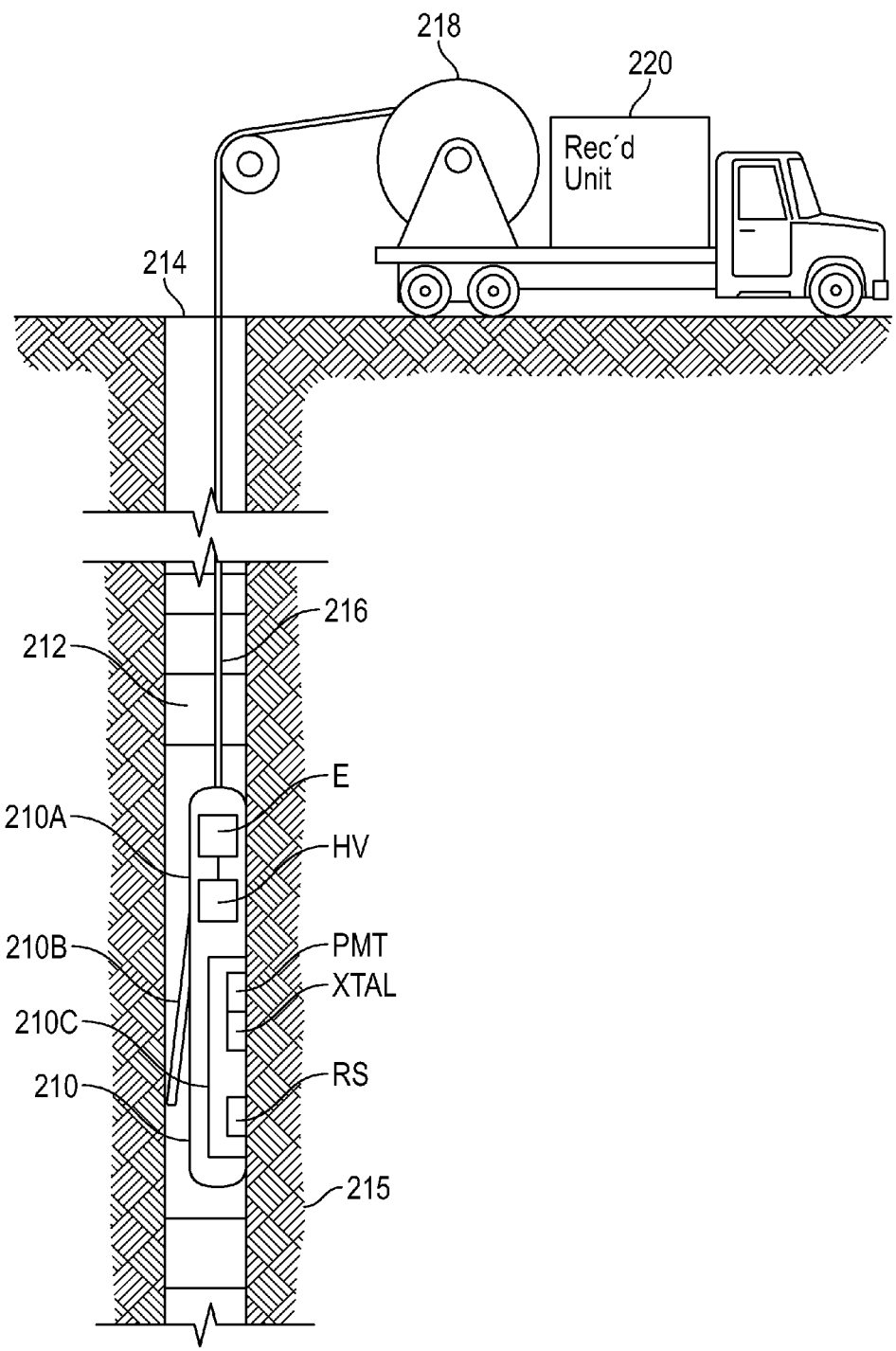
FIG. 1A shows an example of conveying a well logging instrument along the interior of a wellbore.

A well logging instrument including a scintillation detector type radiation counter is shown at 210 in FIG. 1A as it is ordinarily used in a procedure to make measurements of properties of subsurface Earth formations peneTRATed by a wellbore. The wellbore 212 is drilled through the formations, shown generally at 215. The wellbore 212 may be filled with liquid called "drilling mud" 214 during the drilling and well logging procedure, or some form of brine or other completion fluid after wellbore construction is completed. The well logging procedure includes lowering the well logging instrument 210 into the wellbore 212. The instrument 210 may be attached to one end of an armored electrical cable 216. The cable 216 is extended into the wellbore 212 by a winch 218 or similar spooling device to lower the instrument 210 into the wellbore 212. The winch 218 may then be operated to withdraw the cable 216 from the wellbore while various sensors (to be further explained) in the instrument 210 make measurements of various properties of the formations 215 peneTRATed by the wellbore 212. Electrical power may be transmitted along the cable 216 from the surface to operate the instrument 210. Signals corresponding to the measurements made by the various sensors in the instrument 210 (explained above with reference to FIG. 1) may be transmitted along the cable 216 for recording and/or interpretation in a recording unit 220 at the Earth's surface, or in a computer system as will be explained with reference to FIG. 10.

The present example of the well logging instrument may be an instrument that makes measurements corresponding to selected properties of the Earth formations 215 based on spectral analysis of detected gamma rays. Such instruments include a housing 210A in which is disposed certain electronic circuitry, shown generally at E and to be further explained below. The housing 210A may or may not include a backup pad or arm 210B that is biased to one side of the instrument 210 to urge the other side of the instrument 210 into contact with the wall of the wellbore 212. The other side of the instrument 210 may or may not include a tungsten or similar high density skid or pad 210C in which is disposed a source radiation RS, which may be a pulsed neutron source as explained with reference to FIG. 1 above. Although the example instrument shown in FIG. 1A includes various components disposed in a skid or pad, in other examples, the components may be disposed entirely within the instrument housing as shown in FIG. 1.

One or more radiation detectors (e.g., 18, 21 and 20 as explained with reference to FIG. 1) including a scintillation detector crystal XTAL optically coupled to a photomultiplier PMT may be disposed in the pad 210C. A controllable high voltage power supply HV is coupled to the photomultiplier PMT to enable photons applied thereto to be converted to voltage pulses as will be familiar to those skilled in the art. The voltage output of the high voltage power supply HV can be controlled by a controller (not shown separately in FIG. 1A) forming part of the circuitry E to cause the high voltage supply HV maintain a suitable voltage on the photomultiplier PMT. The example instrument shown in FIG. 1A is intended to illustrate an example of conveyance of an instrument in a wellbore as well as to explain examples of detector types that may be used in accordance with the present disclosure in order to obtain measurements that may be processed as will be further explained below.

While the example conveyance of a well logging instrument as shown in FIG. 1A uses armored electrical cable, the foregoing is not intended to limit the scope of instrument conveyance according to the disclosure. Any known means of conveyance may be used in other examples, including, without limitation, as part of a drill string as a logging while drilling (LWD) instrument, conveyed by coiled tubing or slickline.

FIG. 2 shows an example source and detector timing scheme that may be used to acquire measurements for processing as will be further explained with reference to FIG. 9. The source (14 in FIG. 1) may be operated so that selected time duration "bursts" of neutrons may be emitted. This is shown in FIG. 2 at 21. After each burst 21, the source may remain switched off for a selected length of time. This is shown at 22 in FIG. 2. A curve showing gamma rays detected by one or the other of the detectors (18, 20 in FIG. 1) is shown at 24. The detectors (18, 20, 21 in FIG. 1) may detect gamma rays resulting from inelastic collisions of high energy neutrons with nuclei in the formations (215 in FIG. 1A) during the neutron bursts 21 or resulting from capture of thermal neutrons. This is shown schematically as "burst measurement" at 26. This is a measurement during the neutron burst-on time and contains both inelastic gamma rays and capture gamma rays. During the time when the neutron source is switched off, only gamma rays resulting from capture of thermal neutrons may be detected. This is shown schematically at 28 as "capture measurement".

Figure 3:
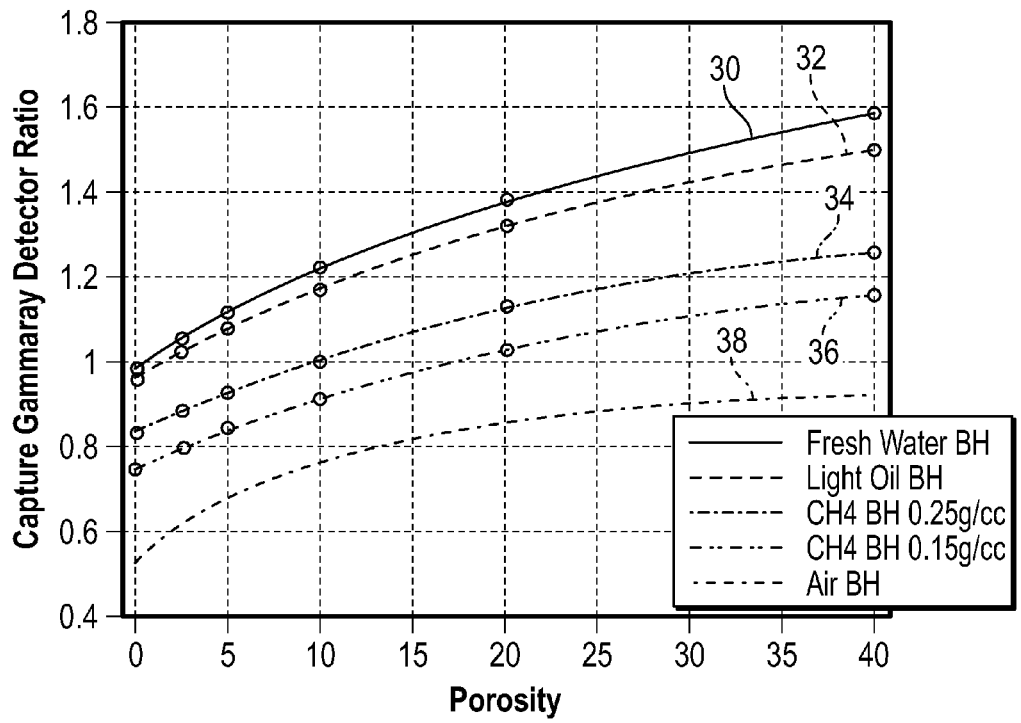
FIG. 3 shows an example of a ratio of numbers of capture gamma rays at two differently spaced detectors with respect to formation porosity for various fluids disposed in a wellbore.

There is a correspondence between the ratio of numbers of capture gamma rays detected at the far spacing detector (20 in FIG. 1) with respect to the numbers detected at the near spacing detector (18 in FIG. 1). FIG. 3 shows a graph of the ratio of capture gamma rays detected (count rate) with respect to porosity of the formations, assuming that the pore spaces of the formations are filled with fresh water at a predetermined temperature and pressure. The various curves shown in FIG. 3 indicate ratio of count rate, which may hereinafter be referred to as the capture ratio (or TRAT) with respect to porosity for different fluids disposed in the wellbore (212 in FIG. 1A). For example, curve 30 shows the correspondence for a wellbore filled with fresh water. Curve 32 shows correspondence for a wellbore filled with "light" oil. Curves 34 and 36 show the correspondence, respectively, for a wellbore filled with methane gas having a density of 0.25 g/cm$^3$ and 0.1 g/cm$^3$. Finally, curve 38 shows the correspondence for a wellbore filled with air.

Figure 4:
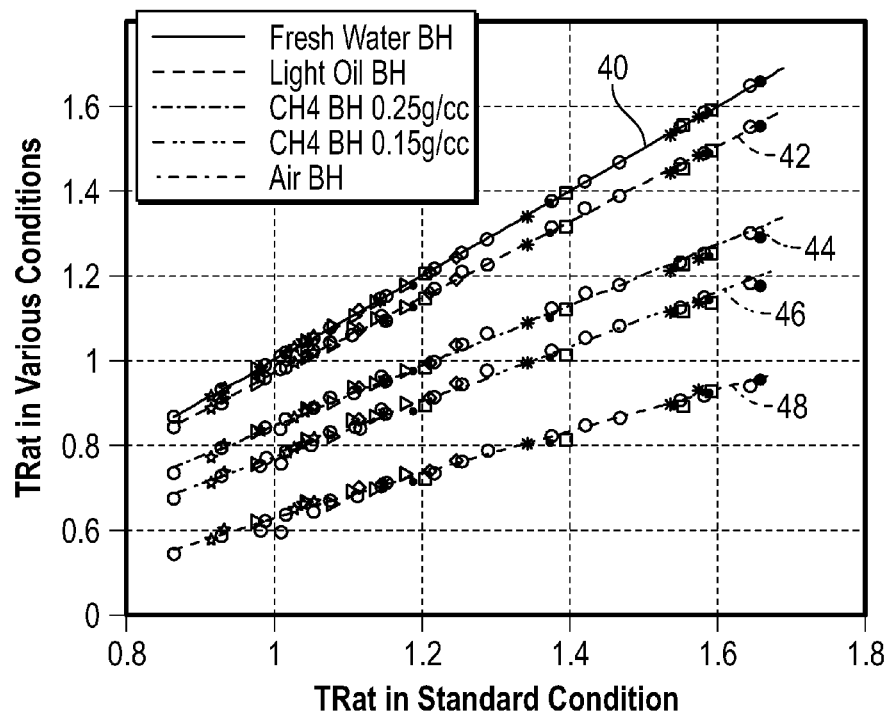
FIG. 4 shows examples of TRAT at standard conditions with those determined with other fluids filling the wellbore.

FIG. 4 shows a graph of the measured count rate ratio TRAT for standard conditions (fresh water filled wellbore) at line 40 with respect to the TRAT measured with different fluids filling the wellbore, at lines 42, 44, 46 and 48 corresponding to the various fluids filling the wellbore as described with reference to FIG. 3. It has been determined through modeling experiments that the TRAT for any value of porosity that would be measured at standard conditions (water filled porosity and fresh water in the wellbore) is related to the TRAT that would be measured wherein various fluids fill the wellbore by a gain and offset. The value of the gain and offset are related to the type of fluid filling the wellbore.

Figure 5:
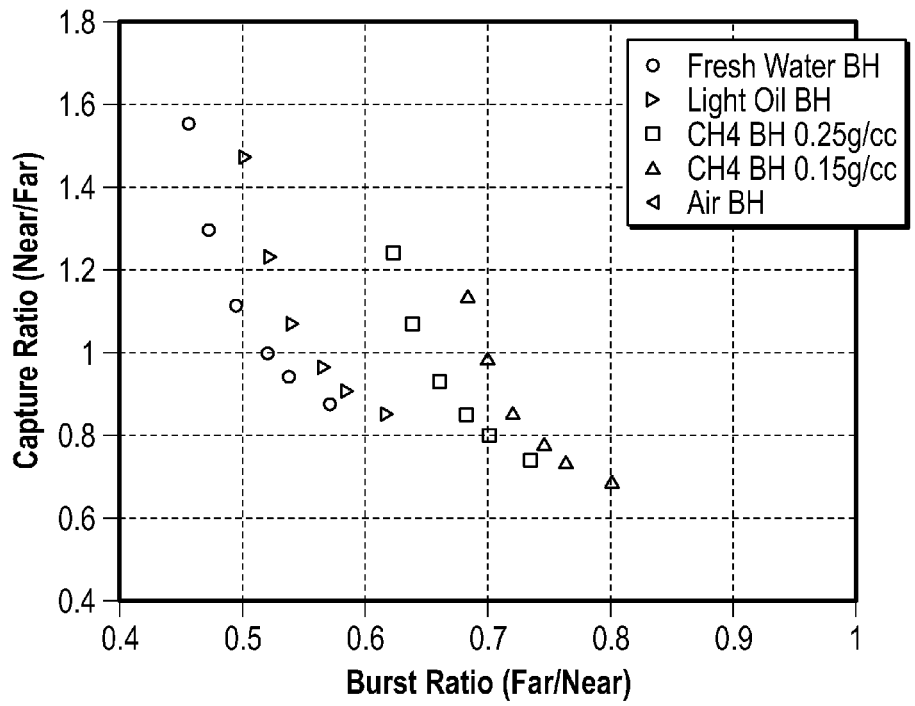
FIG. 5 shows examples of capture gamma ray count rate ratios (abbreviated by "capture ratio") with respect to burst gamma ray count rate ratios (abbreviated by "burst ratio") for various fluids filling the wellbore.

One can obtain two "burst measurements" from two detectors located at two-axial distances from the source, and compute a ratio of their respective count rates as a "burst ratio" BRAT, i.e. the ratio of counts acquired during the entire neutron burst or during a fraction thereof. FIG. 5 shows the same capture ratio (TRAT) vs. a burst ratio in the same borehole and formation conditions. The burst ratio has some dependence on porosity due to the presence of capture gamma rays in the burst gate, that is, the burst ratio as actually measured is contaminated by capture gamma rays. However, the burst ratio is more sensitive to the borehole fluid density variation than the formation porosity variation. Therefore, one may use the burst ratio to correct the borehole gas/oil effects in the capture ratio.

Figure 6:
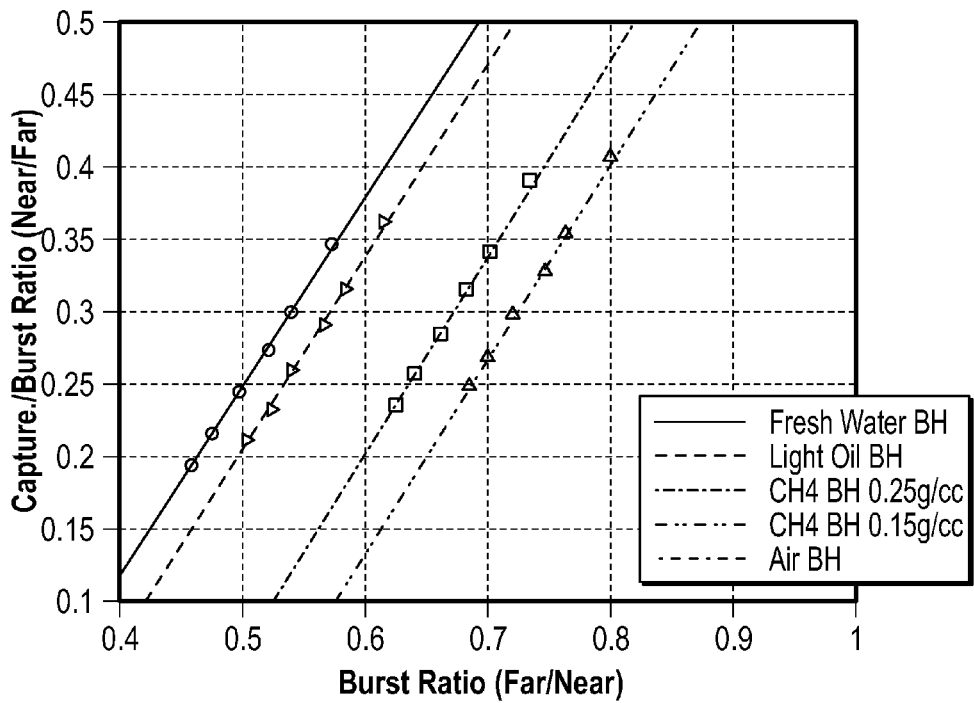
FIG. 6 shows an example of removing the HI sensitivity from a burst ratio using a capture-to-burst detector ratio.

To illustrate the concept more clearly, one can substantially remove the porosity dependence of the burst ratio using a third ratio so that the measured burst ratio is substantially independent of the capture ratio, as shown in FIG. 6. In theory, one would like to have an burst ratio which is not contaminated by capture gamma rays. However, an accurate subtraction of the capture effect from the spectrum acquired during the neutron burst is difficult and may not be sufficiently accurate. The example in FIG. 6 is based on an approximation that the number of capture gamma rays during a burst gate is proportional to the number of capture gamma rays in a capture gate right after the burst gate. The y-axis is the count rate in a capture gate of the far detector divided by the count rate in the burst gate of the near detector; the x-axis is the count rate ratio in the burst gate (Far divided by Near detector). The borehole and formation conditions in FIG. 6 are the same as the ones in FIG. 5. In this example, the third ratio is a ratio between a "capture measurement" and a "burst measurement" from two detectors separately, where the capture measurement is take during a predetermined time interval after the burst with one detector and the burst measurement is taken during the entire neutron burst or a fraction thereof with a second detector. One can call this a capture/burst ratio. As can be observed in FIG. 6, the burst ratio is a linear function of the capture/burst ratio (the third ratio or Rat3) if the borehole conditions are the same. In different borehole conditions, the slope of the linear function does not change. Thus, the HI sensitivity of the burst ratio can be removed using a linear function of the capture/burst ratio determined in various borehole and formation conditions.

Such linear function may be determined as follows. Define IRAT using Eq. 1.

$$IRat = BRat - a \cdot Rat3 \quad (1)$$

$$= \frac{Far(Burst\_Gate)}{Near(Burst\_Gate)} - a \cdot \frac{Far(Capture\_Gate)}{Near(Burst\_Gate)}$$

The coefficient α in Eq. 1 is a constant, which is associated with the tool design and can be characterized by laboratory experiment or by modeling so that there is no HI sensitivity in IRAT. IRAT is very sensitive to gas/oil present in the borehole. It still has sensitivity to formation conditions, such as gas-filled porosity and lithology, but it is relatively small compared to the borehole gas/oil effects. In International Application Publication No. WO 2012/083210 are described many other options to remove the HI sensitivity from a burst measurement. The same techniques can be applied to the present techniques as well. The following section will illustrate that the borehole gas/oil effects on the capture ratio can be estimated using IRAT.

Figure 7:
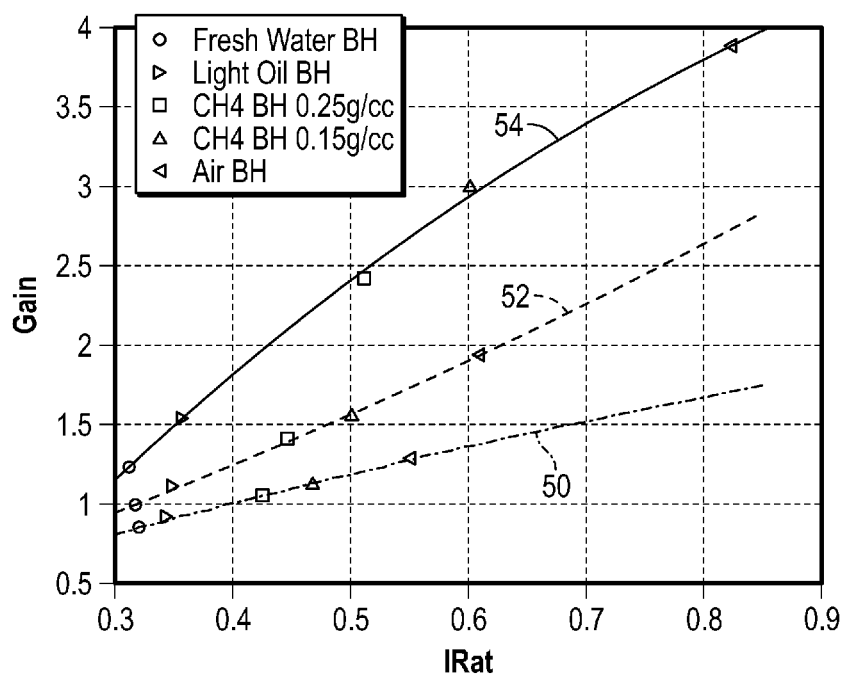
FIG. 7 shows an example of characterization of the gain of the lines of the ratios in FIG. 4 with respect to various wellbore diameters and fluids therein using.
Figure 8:
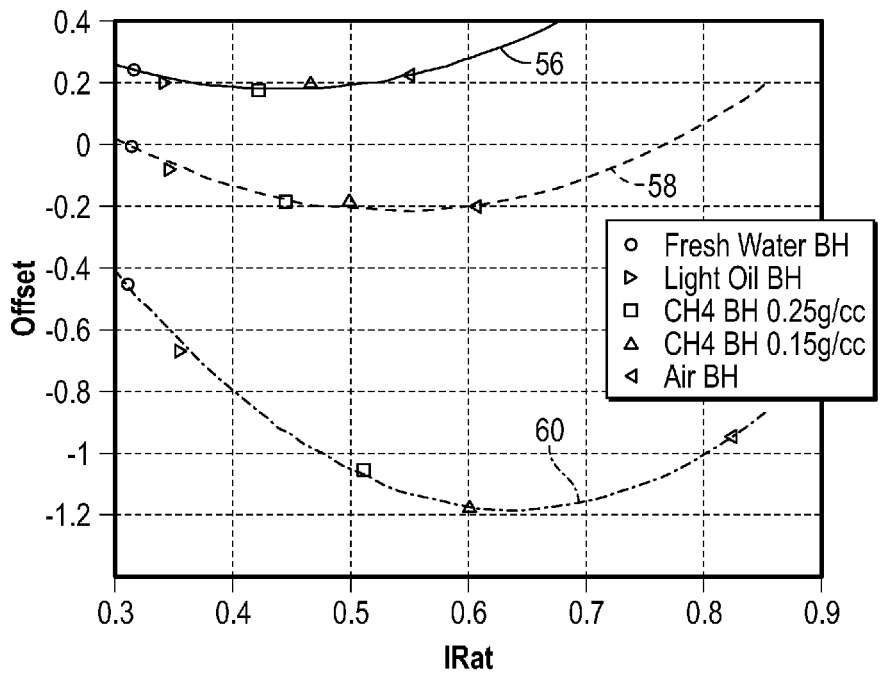
FIG. 8 shows an example of characterization of the offset (zero intercept) of the lines of the ratios in FIG. 4 with respect to various wellbore diameters and fluids therein.

FIG. 7 and FIG. 8 are plots showing the gain and offset, which are used to correct TRAT in various conditions back to the one in standard condition, as a function of IRAT defined in Equation 1. The curves shown at 50, 52, and 54 in FIG. 7, respectively, correspond to different borehole sizes, 6 inches 8 inches, and 12 inches. Corresponding borehole sizes are represented by curves 56, 58 and 60 in FIG. 8. The borehole conditions for the curves in FIG. 7 and FIG. 8 are the same as the ones in FIG. 4, which are 8-inch borehole and a casing with 5.5-inch casing size (OD) and 4.95-inch casing ID. The gain and offset are actually the slope and offset of lines 42, 44, 46, 48 in FIG. 4, corresponding to light oil borehole, methane gas (0.25 g/cm³) borehole, methane gas (0.15 g/cm³) borehole and air borehole. As can be observed in FIGS. 7 and 8, the gain and offset are non-linear functions of IRAT. The values of the IRAT shown in FIG. 7 and FIG. 8 are for 0-pu sandstone only.

In the present example, one may use second order polynomial functions to predict the required gain and offset based on the IRAT, as shown in Eq. 2. The six coefficients (a1, a2, a3, b1, b2, and b3) are constants and associated with the tool design and the actual timing gates chosen for IRAT and TRAT. They can be characterized by laboratory experiment and/or modeling. Substituting Equation 1 in Equation 2, one will obtain Equation 3, which shows that the corrected capture ratio is essentially a second order function of three ratios, a burst ratio, a capture ratio and the third ratio. Note that Equation 3 is only one example. One can generalize Equation 3 to Equation 4 to show that the corrected capture ratio is essentially a function of three ratios.

$$TRat\_corrected = \quad (2)$$
$$(a_1 \cdot IRAT^2 + a_2 \cdot IRAT + a_3) \cdot TRat + (b_1 \cdot IRAT^2 + b_2 \cdot IRAT + b_3)$$

$$TRat\_corrected = \quad (3)$$
$$\ldots [a_1 \cdot (BRat - a_0 \cdot Rat3)^2 + a_2 \cdot (BRat - a_0 \cdot Rat3) + a_3] \cdot TRat +$$
$$\ldots [b_1 \cdot (BRat - a_0 \cdot Rat3)^2 + b_2 \cdot (BRat - a_0 \cdot Rat3) + b_3]$$

$$TRat\_corrected = f(BRat, Rat3, TRat) \quad (4)$$

Figure 8A:
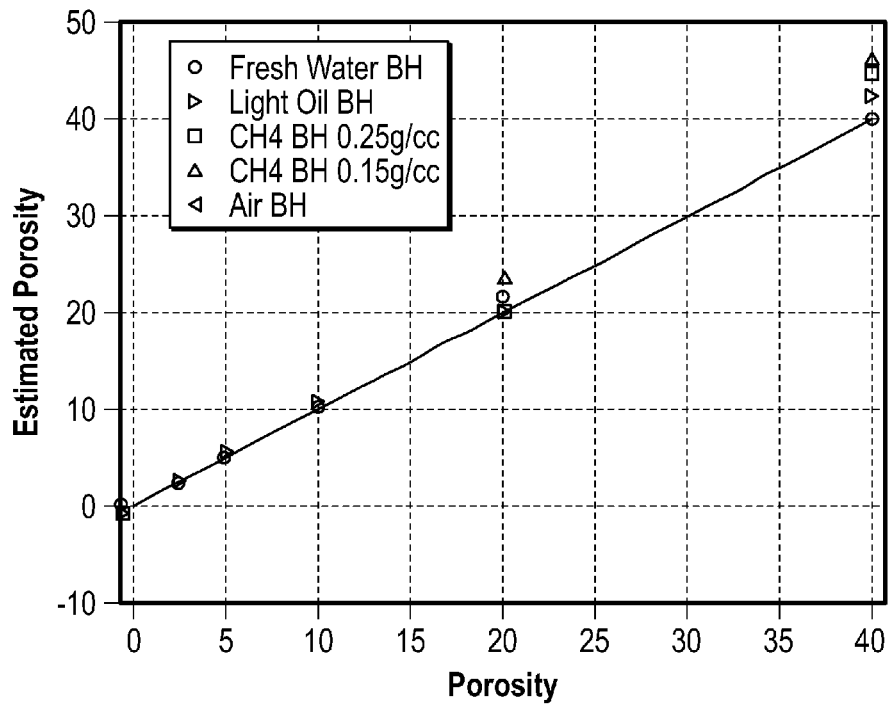
FIG. 8A shows a graph of porosity determined using capture gamma ray detection ratio with respect to actual porosity for various wellbore fluids wherein the capture gamma ray detection ratio is corrected using the burst measurement.

FIG. 8A shows a graph of formation porosity determined from corrected TRAT for various fluids filling the wellbore with respect to actual porosity of the formation. It may be observed in FIG. 8A that there is good correspondence between the porosity determined using the IRAT corrected TRAT for a wide range of fluid types and densities for the fluid filling the wellbore.

Figure 9:
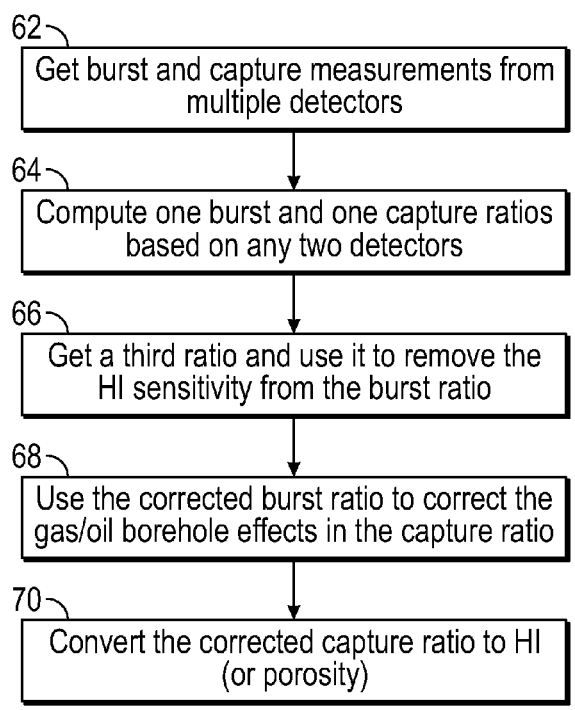
FIG. 9 shows a flow chart of an example method according to the present disclosure.

FIG. 9 shows flow chart of an example method according to the present disclosure. At 62, measurements of inelastic gamma rays and thermal neutron capture gamma rays are made, e.g., as explained with reference to FIG. 2. At 64, ratios of the foregoing count rates, capture ratio and burst ratio may be determined. Such determination, and the subsequent elements of an example method, may be performed in a computer system in the recording unit (220 in FIG. 1A) or on any other computer system as will be explained with reference to FIG. 10. At 66 the third ratio is determined as explained above. At 56 for the particular well logging instrument used, the gain and offset used to correct the measured TRAT may be determined as explained with reference to Eq. (2) using the measured IRAT. Finally, the corrected TRAT may be used, at 58, to determine formation hydrogen index (HI) or porosity.

In the same borehole conditions, the required gain and offset do not depend on the formation conditions. However, IRAT will have some formation dependency (lithology, gas-filled porosity, etc.). Thus, the computed gain and offset based on the IRAT will have some formation dependency as well. Fortunately, the lithology and gas-filled porosity effects turn out to be about 10 times smaller than the gas/oil borehole effects on the burst ratio. Therefore, the burst ratio can be used to compute the gas/oil borehole correction.

Figure 10:
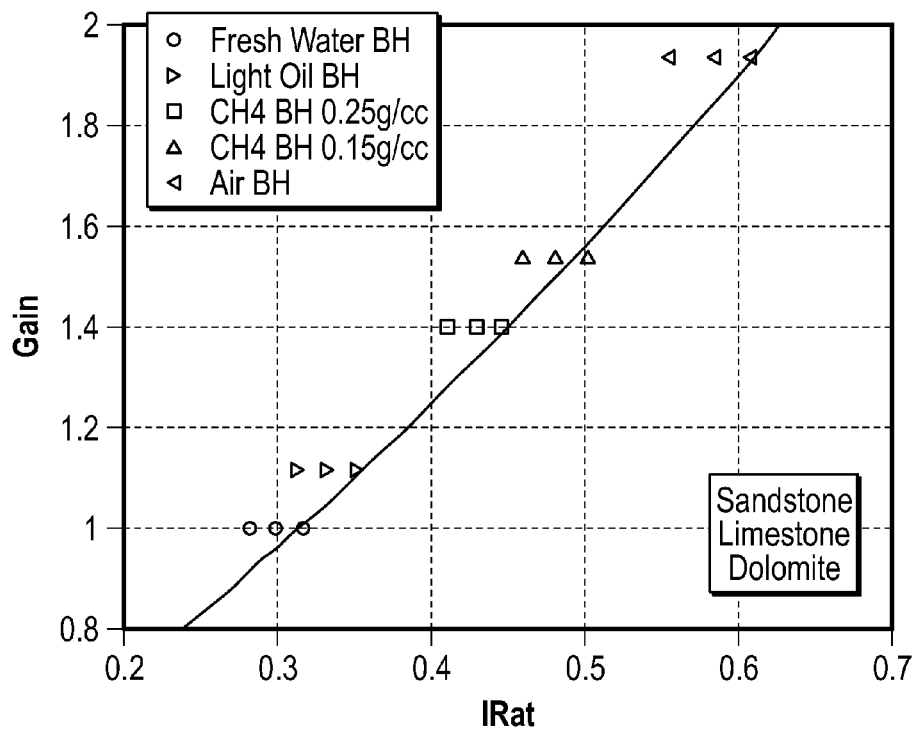
FIG. 10 shows a graph of dispersion in the results shown in FIG. 7 caused by the formation lithology effect in IRAT.

Some of the errors in the oil/gas borehole correction shown in FIG. 8A are due to the small dependence of IRAT on formation lithology. FIG. 10 shows the required gain as a function of IRAT for 0-pu sandstone, limestone and dolomite. Comparing to FIG. 7, which is only for 0-pu sandstone, one can see some dispersion in IRAT. Since the method used to predict the required gain and offset from the IRAT is characterized based on 0-pu sandstone conditions, IRAT will read lower in limestone or dolomite conditions, which will underestimate the gain (as shown in FIG. 10) and the porosity.

There are several ways to improve the correction. One can remove the HI sensitivity from the burst ratio using a non-linear formula or database-search method as discussed in the above referenced International Application publication. Another way is to use a long adaptive filter on the predicted gain and offset, to average out the leftover formation sensitivity in the gain and offset. In some conditions, one can even fix the gain and offset to their average values in certain zones.

Note that there is a plurality of options to remove the HI sensitivity from the burst ratio. For example, instead of using the capture/burst ratio, one can use TRAT itself to remove the HI sensitivity. As shown in FIG. 5, the HI sensitivity in the burst ratio can be removed based on a non-linear function of the capture ratio. Thus, one can compute IRAT using Equation 5. Substituting Equation 5 to Equation 2, the corrected TRAT can be written as a non-linear function of only a burst ratio and a capture ratio as shown in Equation 6. There is no third ratio in such example. On top of that, one can combine the steps shown at 66 and 68 in FIG. 9. One may separate capture and inelastic events when computing a burst ratio in order to illustrate the idea of gas/oil borehole correction clearly. Similarly, one can introduce a fourth ratio or more ratios to better remove the HI sensitivity or other formation dependency from the burst ratio, or better correct the borehole gas/oil effects on the capture ratio.

$$IRat = BRat + f(TRat) \quad (5)$$

$$TRat\_corrected = f(BRat, TRat) \quad (6)$$

The concept of the present disclosure can also be applied to a tool design which contains at least one gamma ray detector and in which the neutron output of the generator is known. One possibility is the use of a neutron monitor such as a fast neutron (1 MeV energy and higher) detector installed proximate to the neutron source to monitor the variation of the neutron source output. Any or all the detector ratios discussed herein (either burst ratio, capture ratio or the third ratio) can be replaced by the ratio of a detected gamma ray count rate in a given timing gate and a signal indicative of the neutron output of the neutron generator. In the case of a fast neutron detector used as a neutron monitor, the number of fast neutron counts registered in the detector is directly related to the neutron output. Alternatively, the neutron output may be determined from the generator operating parameters or from the determination of radiation directly related to the neutron output of the generator and unaffected by the tool environment or a combination of a several neutron output measurements. Additionally, the concept of the present disclosure may also work for a tool equipped with more than two axially spaced apart gamma ray detectors. In such case, the detector ratios can be computed from any two detectors among the detectors in the tool.

Figure 11:
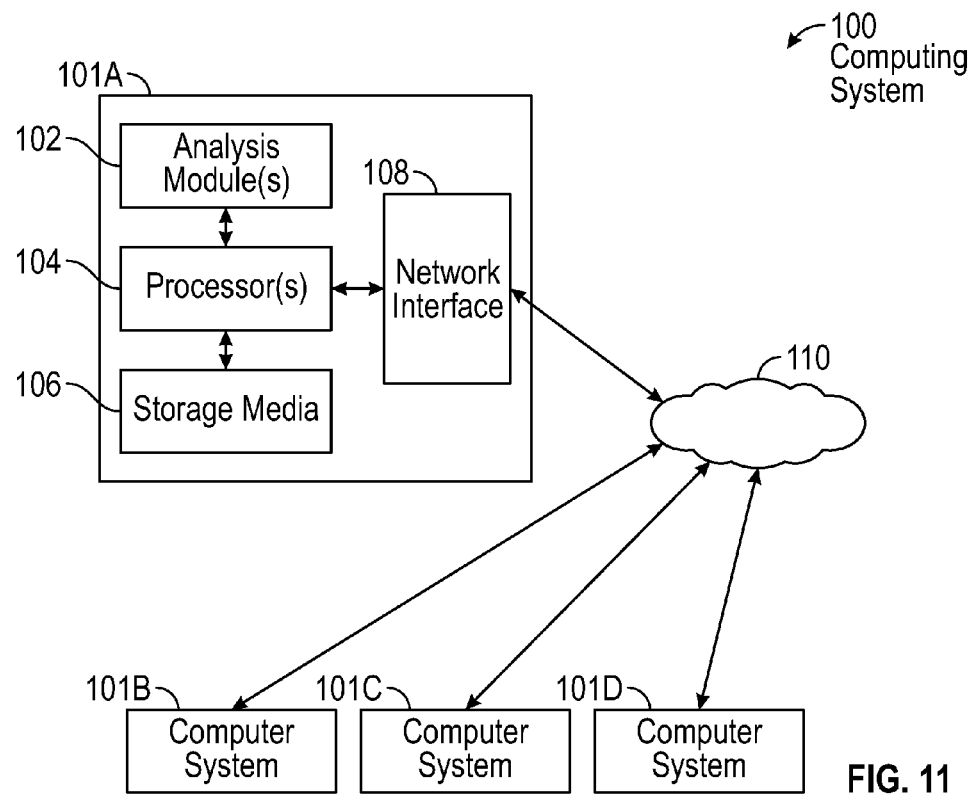
FIG. 11 shows a computer system that may be used in some examples.

FIG. 11 depicts an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks depicted in FIG. 9. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be on a ship underway on the ocean or on a well drilling location, while in communication with one or more computer systems such as 101C and/or 101D that may be located in one or more data centers on shore, aboard ships, and/or located in varying countries on different continents). Storage media and/or processor(s) may also be disposed in the well logging tool (10 in FIG. 1).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 10 the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 11, and/or computing system 100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

In order to automatically correct the oil/gas borehole effects in real time, it is useful to characterize the tool responses in known conditions for different borehole sizes and/or casing configurations. However, oil and gas borehole conditions are difficult to reproduce in the laboratory. A pressurized vessel is necessary to reproduce gas borehole conditions in laboratory. This is not only expensive but also poses a danger to the operators. A diesel-filled borehole can be made practically, but the tool response is so similar to that in a water filled borehole that it does not materially assist in tool characterization. A light oil-filled borehole is not practical either due to the flammability and the rate of evaporation of most liquids that resemble light oil.

Figure 12:
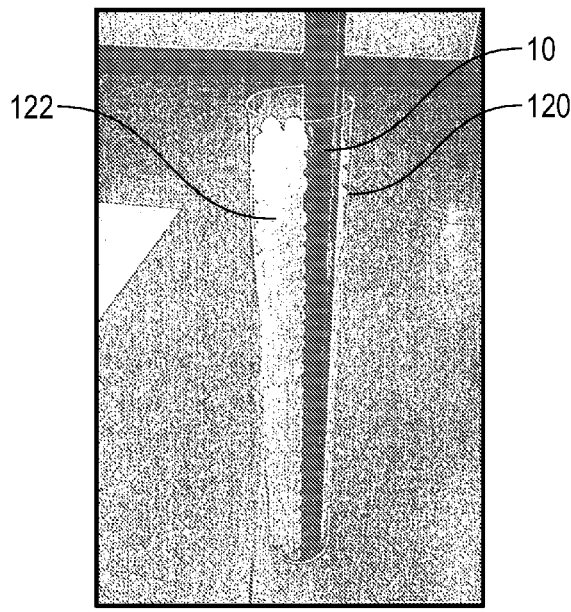
FIG. 12 shows an example tool characterization apparatus.

A novel technique which reduces safety concerns is to use plastic balls mixed with either air or water to simulate oil/gas borehole conditions. This technique is very easy to use and inexpensive. The origin of this technique is the realization that for nuclear measurements the particular chemical form of a material does not matter. The only factor affecting nuclear measurements is the volumetric number density of all the component elements. FIG. 12 shows some plastic balls 122 and a logging tool 10 inside a transparent plastic tube 120 to illustrate the basic idea. A plastic tube (polyethylene or polypropylene) can be used as a borehole liner or a casing in the laboratory. Bottom and top caps (not shown) hold all the balls in place. Because the density of the balls may be lower than that of water, one can fill the borehole (tube 120) with water and the balls 122 will float up and can be collected easily.

The proposed technique can easily be extended to mixtures of other materials with water or other liquids. Hollow balls of any material can be used and other liquids can be substituted for the water. This allows the operator to cause the simulated borehole fluid composition to match the properties of the desired real world condition.

A list of techniques that extends the range of possible borehole fluids that can be modeled (e.g. including but not limited to $CO_2$) may include: (a) hollow solid particles mixed with a fluid (e.g. air or water). One can optimize the thickness and material of the hollow particles to achieve a particular element density; (b) constant stream of gas that is released at the bottom of a liquid column to create a stable (i.e. compositionally the same as a function of time) mix of gas and liquid with the desired properties while it rises; (c) a fluidized bed wherein solid particles are brought into constant motion by a fluid being pumped from below to create a stable composition as a function of time; (d) a foam, either stable or unstable (e.g. a foam temporarily stabilized by a surfactant or a more permanent foam such as polystyrene or neoprene); (e) machined or otherwise purposely structured solid (e.g. a carbon rod with a multitude of holes in it to model $CO_2$).

A series of measurements can be made using this technique for different formation tanks. Then the measurements can be used to characterize the borehole gas/oil correction method, which was discussed earlier. One can also use the same measurements to benchmark/validate modeling simulation and use modeling to extent the formation/borehole conditions to a wider realistic range. The characterization method is an integral part of this borehole fluid correction method due to the nonlinear behavior of the correction term between the air point and the water point. A characterization of the correction term between these two extremes dramatically improves the performance of the algorithm.

Figure 13:
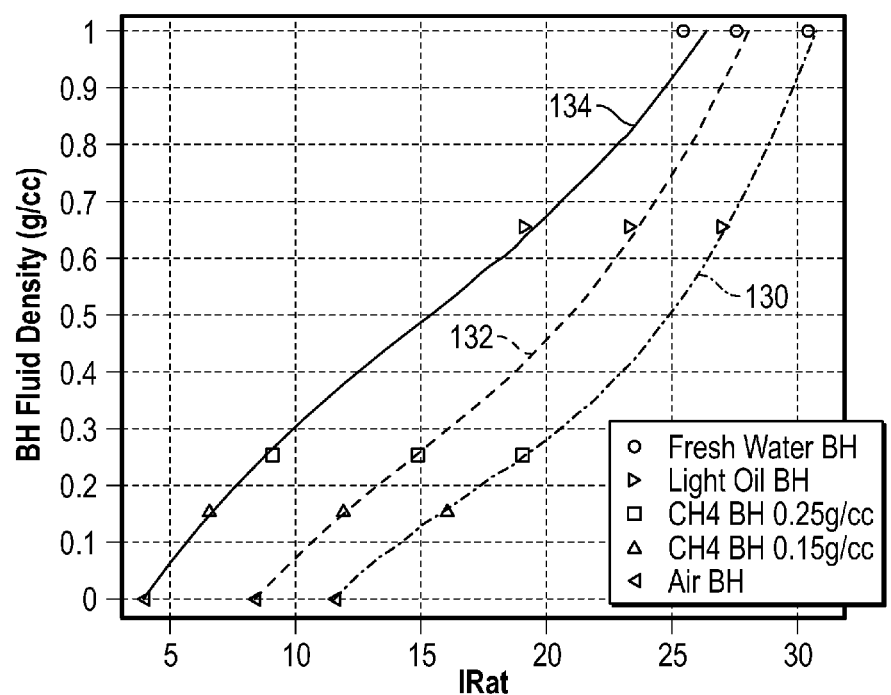
FIG. 13 shows a graph of borehole fluid density as a function of burst measurement.

Beside the gas borehole correction for the porosity measurement, the burst measurement can also be used to measure borehole fluid density. FIG. 13 shows the borehole fluid density for a 6-inch wellbore at 130, an 8-inch wellbore at 132 and a 12.25 inch wellbore at 134 as a function of the burst measurement. The curves are a third order polynomial fit. If the borehole size in open hole conditions or the casing size is known, one may characterize the burst measurement and use it to derive the borehole fluid density.

In other embodiments, TRAT may computed as a capture gamma ray count rate measurement from the near detector (18 in FIG. 1) divided by a capture gamma ray measurement from the far detector (20 in FIG. 1). BRAT may computed as a burst gamma ray count rate measurement from the near detector divided by a burst gamma ray count rate measurement from the far detector. In such embodiments, gamma ray counts detected by the deep detector (21 in FIG. 1) may also be used. In certain embodiments, processing burst counting rates and capture gamma ray counting rates as will be further described below may enable determining hydrogen index of a formation (and its corresponding porosity when corrected for formation mineral composition) that is corrected for both wellbore fluid effect and casing/cement effect.

Figure 14:
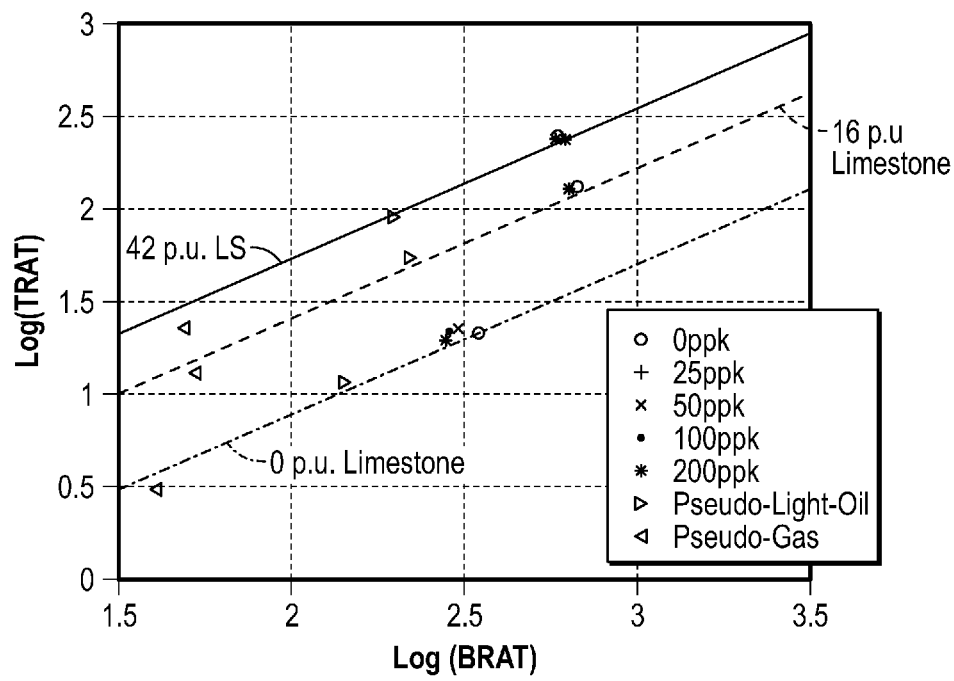
FIG. 14 shows a graph of log(TRAT) with respect to log(BRAT).

FIG. 14 shows a graph of the logarithm of TRAT with respect to the logarithm of BRAT for three formation conditions: 0 p.u. limestone, 16 p.u. limestone and 42 p.u., each in limestone in an 8 inch diameter uncased wellbore. For each formation condition, the borehole fluid can be fresh water, 25 parts per thousand sodium chloride solution (ppk) water, 50 ppk water, 100 ppk water, 200 ppk water, pseudo gas, or pseudo-light oil. The three solid lines which are parallel to each other fit through the three formation conditions with various borehole fluids. The graph clearly shows the borehole fluid effects on TRAT can be compensated using BRAT linearly in the logarithm space. The term TRAT_corrected may be defined as the corrected capture gamma ray count rate ratio in logarithm space. Borehole compensation may be performed using Eq. (7) below, where the coefficient "a" is the slope of the solid lines in FIG. 14. The compensated TRAT_corrected has very little borehole fluid effect and is still sensitive to porosity variation. The distance between the solid lines is the porosity dynamic range of TRAT_corrected. Then one can compute porosity from TRAT_corrected substantially free of borehole fluid effect.

$$\log(\text{TRAT\_corrected}) = \log(\text{TRAT}) - a \cdot \log(\text{BRAT}) \quad (7)$$

The present example method shown here is performed in logarithmic space, which is different from the methods described above with reference to Eqs. (2) and (3). Eq. (7) has no cross term between TRAT and BRAT.

Figure 15:
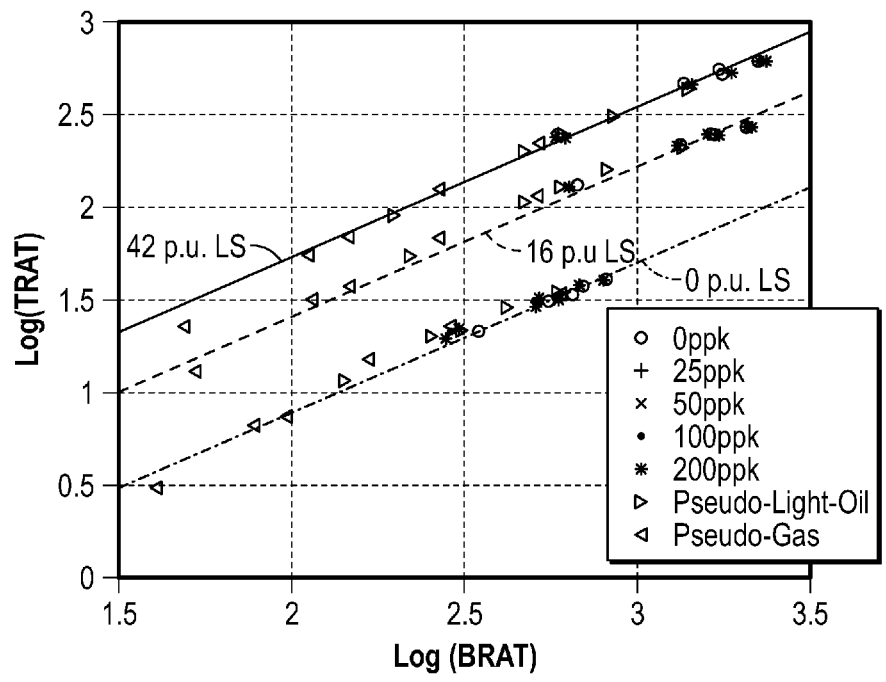
FIG. 15 shows a graph of data similar to those in FIG. 14, wherein additional points correspond to four different casings, each of which is combined with seven different borehole fluids for three formation conditions.

It has been determined that the compensation method in Eq. (7) not only removes wellbore fluid effect, but also remove the casing effect as well in one step. FIG. 15 shows the same uncased wellbore with formation conditions the same as FIG. 14, as well as four different casing conditions, each of which is combined with seven different borehole fluids. The three solid lines are the same as the ones in FIG. 14. FIG. 15 shows the casing effect and light hydrocarbon wellbore fluid effect behave very similarly as the logarithm of TRAT and the logarithm of BRAT. Heavy (thick walled) casing will make both TRAT and BRAT increase; while light hydrocarbon will make both TRAT and BRAT decrease.

Figure 16:
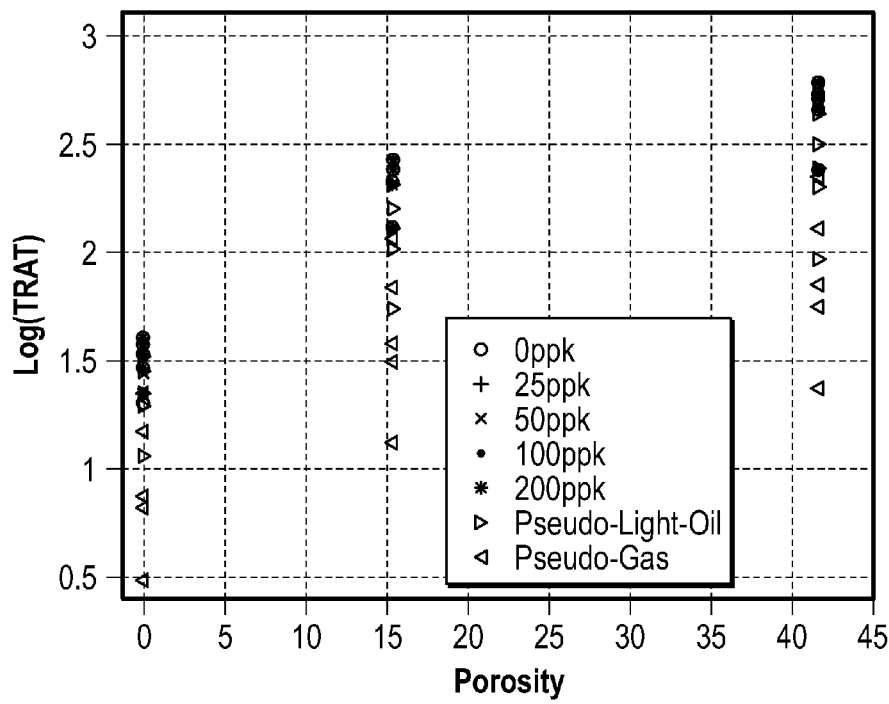
FIG. 16 shows a graph of log(TRAT) as a function of formation porosity in the borehole conditions of the data shown in FIG. 15.
Figure 17:
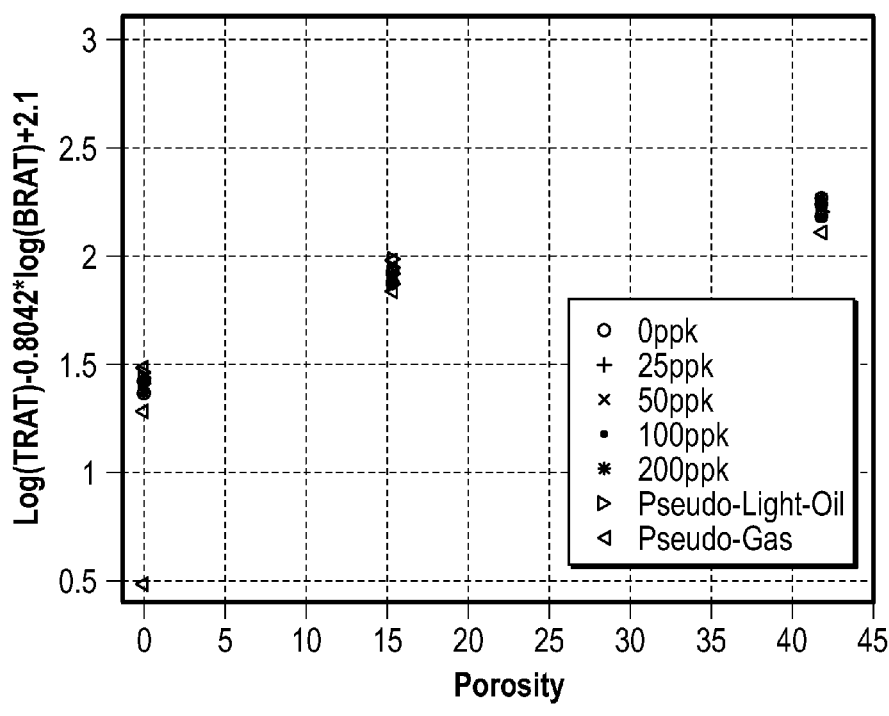
FIG. 17 shows a graph of corrected TRAT as a function of formation porosity in various borehole conditions.

All the foregoing wellbore fluid and casing/cement effects may be compensated using Eq. (7) having only one coefficient. FIG. 16 shows a graph of the logarithm of TRAT as a function of formation porosity in all the above described wellbore conditions. It may be observed in FIG. 16 that wellbore fluid and casing effects on TRAT are significant before compensation. FIG. 17 shows a graph of TRAT_corrected after compensation as a function of formation porosity in all the foregoing wellbore conditions. FIG. 17 shows the wellbore effects after compensation are eliminated or substantially reduced.

Because the compensation method using Eq. (7) can correct for wellbore fluid and casing/cement effects, which are very different effects, with only one coefficient, it is believed that the same method can also correct many other effects at the same time such as standoff, eccentric casing, cement washout, tubing, etc. For example, standoff effect is in effect a modified casing/cement effect relative to uncased condition, except that the casing and cement are substituted by wellbore fluid. Because the foregoing compensation method can correct for various casing weights and cement thicknesses, in which conditions the casing and tool positions relative to wellbore may vary substantially, a wellbore having eccentric casing or cement washout is not very different. A condition with a tubing can be treated as a condition with an additional casing. The foregoing compensation method is expected work for a wide range of open hole or cased hole conditions.

Figure 18:
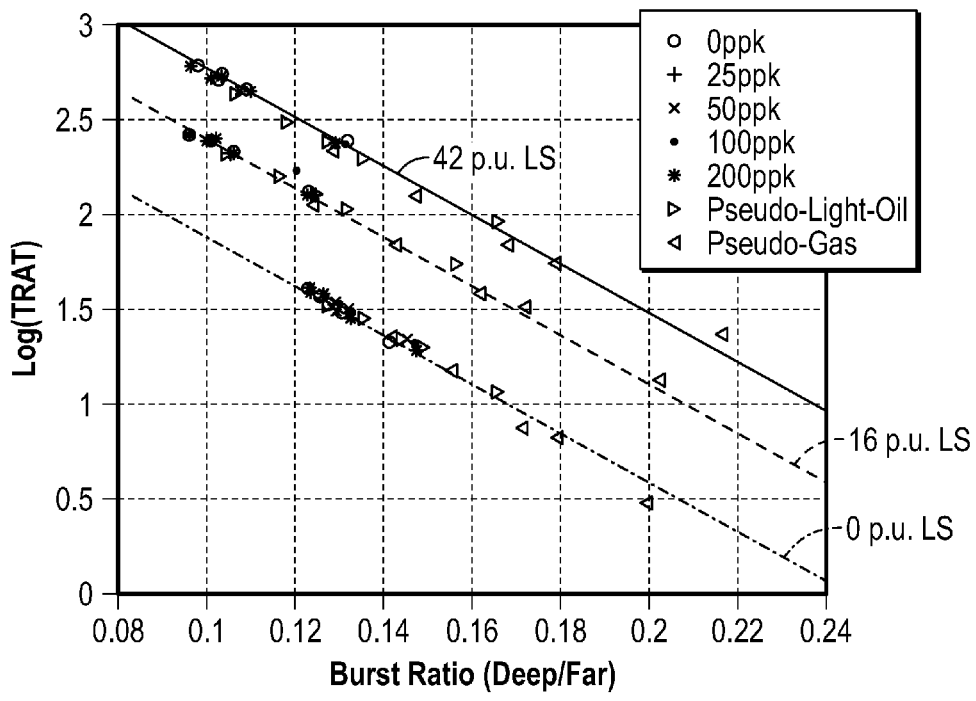
FIG. 18 shows a graph of Log(TRAT) with respect to burst ratio computed as deep detector count rate divided by far detector count rate in various borehole conditions.

FIG. 18 shows a graph of an example of TRAT which is computed as the capture gamma ray near detector (18 in FIG. 1) count rate divided by the deep detector (21 in FIG. 1) count rate with respect to BRAT, which is computed as the deep detector count rate divided by the far detector count rate during the burst. The y-axis is scaled as the log of TRAT, but the x-axis is BRAT (deep/far) on a linear scale. Similarly to using to Eq. (7), compensation for wellbore effects may be performed using Eq. (8).

$$\log(\text{TRAT\_correct}) = \log(\text{TRAT}) - a \cdot \text{BRAT} \tag{8}$$

Figure 19:
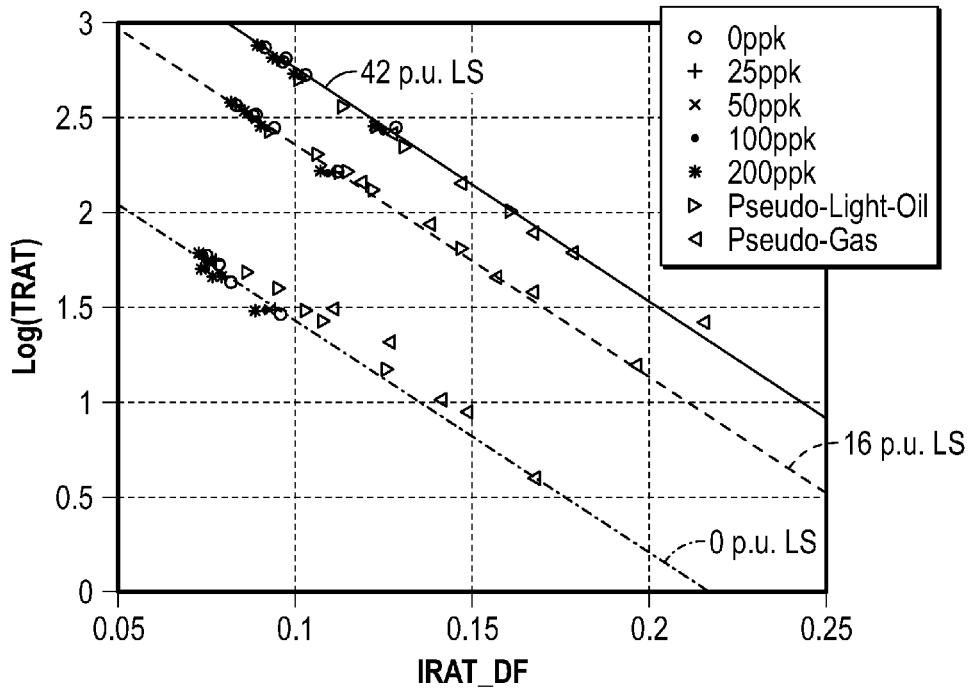
FIG. 19 shows a graph of Log(TRAT) with respect to corrected burst ratio IRAT computed as deep detector counting rate divided by far detector counting rate in various borehole conditions.

There is porosity sensitivity in the burst ratio BRAT. Therefore, after compensation using the burst ratio, the capture ratio porosity sensitivity will be reduced. One can remove water filled porosity sensitivity from the burst ratio before performing wellbore effect compensation. Eq. (1) provides one method to correct the burst ratio. Eq. (9) below shows another example of correcting a burst measurement using a capture measurement before determining the ratio. The two coefficients $a_1$ and $a_2$ are not necessary the same. The two coefficients can be determined to remove the water-filled porosity sensitivity in the ratio. They can also be determined to remove the capture gamma ray count rate in the burst count rate by using a count rate in a capture gate. FIG. 19 shows the log of TRAT with respect to IRAT_DF, where IRAT is the same parameter as defined in Eq. (1). Comparing FIG. 19 to FIG. 18, one can observe that the distance between the solid lines increases, which means the porosity dynamic range after compensation is larger by using a corrected burst ratio, IRAT_DF, than the raw burst ratio.

$$\text{IRAT\_DF} = \frac{\text{correct\_burst\_measurement\_Deep}}{\text{correct\_burst\_measuremet\_Far}} = \frac{\text{Deep(Burst\_Gate)} - a_1 \cdot \text{Deep(Capture\_Gate)}}{\text{Far(Burst\_Gate)} - a_2 \cdot \text{Far(Capture\_Gate)}} \tag{9}$$

Figure 20:
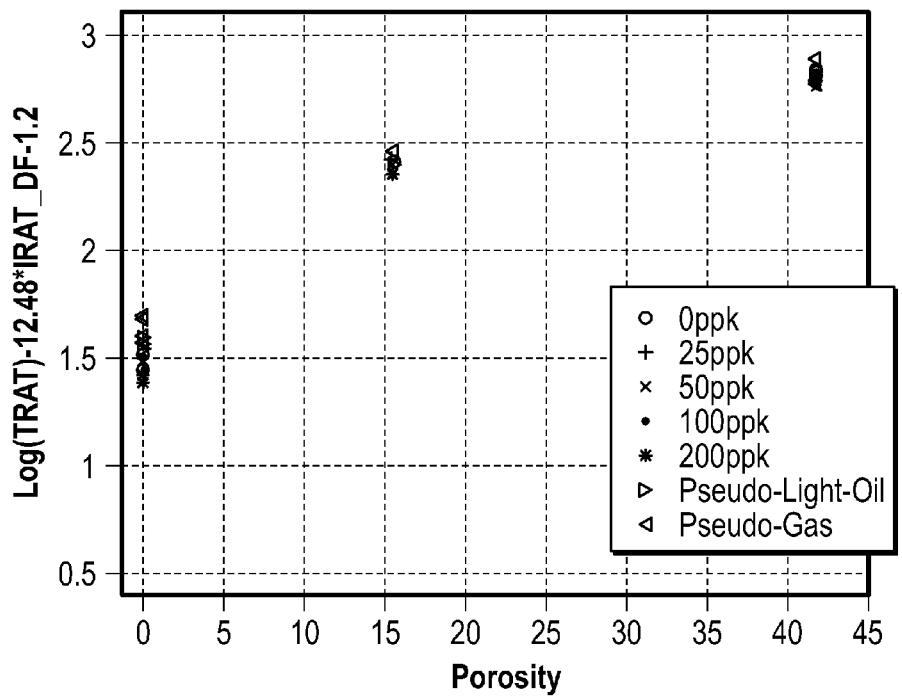
FIG. 20 shows a graph of corrected TRAT as a function of formation porosity in various borehole conditions.

The compensation can be performed using Eq. (10) below. FIG. 20 shows corrected TRAT as a function of porosity for all the foregoing wellbore conditions.

$$\log(\text{TRAT\_correct}) = \log(\text{TRAT}) - a \cdot \text{IRAT\_DF} \tag{10}$$

The general formula of corrected TRAT can be written as Eq. (11) using the raw burst count rate ratio without correcting for water filled porosity sensitivity. Eq. (12) shows the general formula of the corrected TRAT, with compensation by using a corrected burst count rate ratio from two detectors d1 and d2 (e.g., detectors 18 and 20 in FIG. 1).

$$\text{TRAT\_correct} = f(\text{TRAT}, \text{BRAT}) \tag{11}$$

$$\text{TRAT\_correct} = f\left(\text{TRAT}, \frac{\text{corrected\_burst\_measurement\_d1}}{\text{corrected\_burst\_measurement\_d2}}\right) \tag{12}$$

Figure 21:
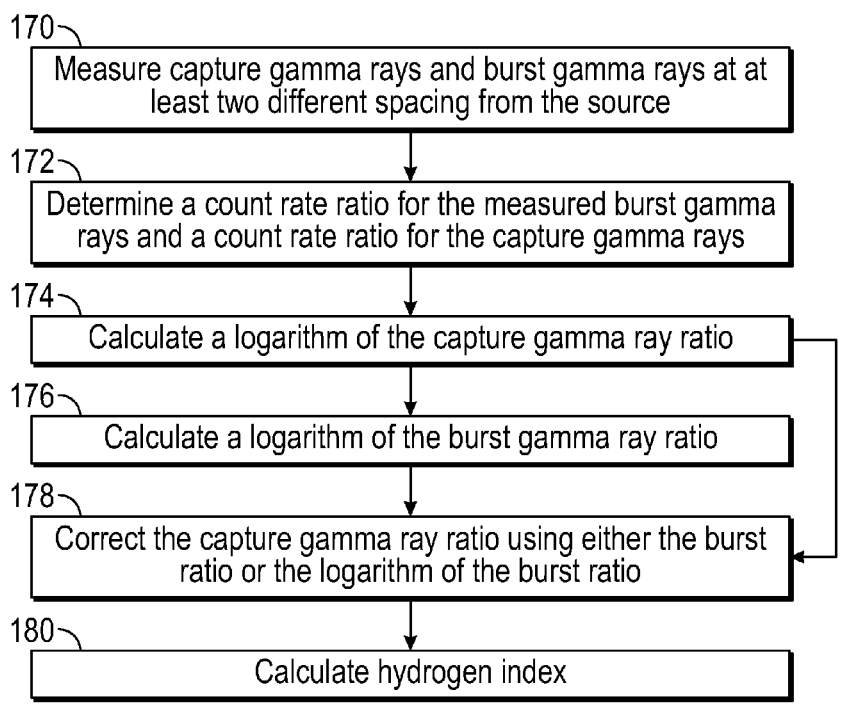
FIG. 21 shows a flow chart of another example embodiment.

A flow chart of the embodiments described above with reference to FIGS. 14-20 is shown in FIG. 21. At 170, burst gamma rays and capture gamma rays are measured at at least two different spacings from the pulsed neutron source (14 in FIG. 1). At 172, the burst count rate ratio and the capture gamma ray count rate ratio are calculated using the respective measured gamma rays at the respective two distances from the pulsed neutron source. At 174, the logarithm of the capture gamma ray count rate ratio is calculated. At 176, the logarithm of the burst ratio is calculated. At 178, the burst ratio or the logarithm of the burst ratio is used to correct the capture gamma ray count rate ratio. The corrected capture gamma ray count rate ratio may be used, at 180, to calculate the hydrogen index of the formation.

The process shown in flow chart form in FIG. 21 may be implemented on any computer system, including the one explained above with reference to FIG. 11.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a formation hydrogen index, comprising:
    using a processor configured to receive measurements of numbers of gamma rays detected during operation of a pulsed neutron source ("burst gamma rays") to irradiate a formation and numbers of thermal neutron capture gamma rays made at at least two different axial spacings from the pulsed neutron source;
    wherein the processor determines at least one of (i) a first ratio of and (ii) a first logarithm of the first ratio of the numbers of burst gamma rays detected at a first axial spacing with respect to a number of burst gamma rays detected at a second axial spacing, and at least one of (i) a second ratio of and (ii) a second logarithm of the second ratio of the numbers of thermal neutron capture gamma rays detected at a first axial spacing with respect to the numbers of thermal neutron capture gamma rays detected at a second axial spacing;
    wherein the processor calculates a corrected second ratio of the numbers of thermal neutron capture gamma rays using at least one of (i) the first logarithm and (ii) the first ratio, and at least one of (i) the second ratio of and (ii) the second logarithm; and
    wherein the processor determines the formation hydrogen index from the corrected second ratio.

2. The method of claim 1 wherein the first axial spacing and the second axial spacing at which thermal neutron capture gamma rays are detected are the same as the first axial spacing and the second axial spacing at which burst gamma rays are detected.

3. The method of claim 1 wherein the first axial spacing and the second axial spacing at which thermal neutron capture gamma rays are detected are different than the first axial spacing and the second axial spacing at which burst gamma rays are detected.

4. The method of claim 3 wherein the first axial spacing at which burst gamma rays are detected is a same axial distance as the second axial spacing at which thermal neutron capture gamma rays are detected.

5. The method of claim 1 wherein the hydrogen index is corrected for borehole fluid effect.

6. The method of claim 1 wherein the hydrogen index is corrected for casing and cement effect.

7. The method of claim 1 wherein the hydrogen index is corrected for both casing and cement effect and borehole fluid effect.

8. A method for well logging, comprising:
moving a pulsed neutron well logging instrument along an interior of a wellbore drilled through subsurface formations, the instrument comprising a pulsed neutron source and at least two gamma ray detectors each located at a different axial spacing from the source;
at selected times, imparting selected duration bursts of high energy neutrons into the subsurface formations;
measuring numbers of gamma rays during the selected duration bursts ("burst gamma rays");
measuring numbers of thermal neutron capture gamma rays at selected times after each of the selected duration bursts;
determining, via a processor, at least one of (i) a first ratio of and (ii) a first logarithm of, the numbers of burst gamma rays detected at a first axial spacing with respect to a number of burst gamma rays detected at a second axial spacing, and a second logarithm of a second ratio of the numbers of thermal neutron capture gamma rays detected at a first axial spacing with respect to the numbers of thermal neutron capture gamma rays detected at a second axial spacing;
calculating, via the processor, a corrected second ratio of the numbers of thermal neutron capture gamma rays using at least one of (i) the first logarithm and (ii) the first ratio, and the second logarithm; and
using the processor to determine the formation hydrogen index from the corrected second ratio.

9. The method of claim 8 wherein the first axial spacing and the second axial spacing at which thermal neutron capture gamma rays are detected are the same as the first axial spacing and the second axial spacing at which burst gamma rays are detected.

10. The method of claim 8 wherein the first axial spacing and the second axial spacing at which thermal neutron capture gamma rays are detected are different than the first axial spacing and the second axial spacing at which burst gamma rays are detected.

11. The method of claim 10 wherein the first axial spacing at which burst gamma rays are detected is a same axial distance as the second axial spacing at which thermal neutron capture gamma rays are detected.

12. The method of claim 8 wherein the hydrogen index is corrected for borehole fluid effect.

13. The method of claim 8 wherein the hydrogen index is corrected for casing and cement effect.

14. The method of claim 8 wherein the hydrogen index is corrected for both casing and cement effect and borehole fluid effect.

15. A well logging instrument, comprising:
a pulsed neutron source disposed in a housing configured to traverse a wellbore drilled through subsurface formations;
a first gamma ray detector disposed in the housing at a first distance from the source;
at least a second gamma ray detector disposed at a second distance from the source, the second distance longer than the first distance; and
a processor configured to accept as input signals corresponding to detection of gamma rays by each of the first and the at least a second detector, the detected gamma rays occurring both during ("burst gamma rays") and at selected times after actuation of the source, the processor configured to perform actions on the input signals comprising:
determining at least one of (i) a first ratio of and (ii) a first logarithm of, the numbers of burst gamma rays detected by the first detector with respect to a number of burst gamma rays detected by the at least a second detectors, and a second logarithm of a second ratio of the numbers of thermal neutron capture gamma rays detected the first detector with respect to the numbers of thermal neutron capture gamma rays detected by the at least a second detector;
calculating a corrected second ratio of the numbers of thermal neutron capture gamma rays using at least one of (i) the first logarithm and (ii) the first ratio, and the second logarithm; and
determining the formation hydrogen index from the corrected second ratio.

16. The instrument of claim 15 wherein the first distance and the second distance at which thermal neutron capture gamma rays are detected are the same as the first distance and the second distance at which burst gamma rays are detected.

17. The instrument of claim 15 wherein the first detector and the second detector at which thermal neutron capture gamma rays are detected are different than the first detector and the second detector at which burst gamma rays are detected.

18. The instrument of claim 17 wherein he first detector at which burst gamma rays are detected is at same spacing from the source as the second detector at which thermal neutron capture gamma rays are detected.

* * * * *